(12) United States Patent
Kokajko et al.

(10) Patent No.: US 12,348,574 B2
(45) Date of Patent: Jul. 1, 2025

(54) CHAT OVERLAY IN VIDEO CONFERENCES

(71) Applicant: Zoom Video Communications, Inc., San Jose, CA (US)

(72) Inventors: Sam Kokajko, Round Rock, TX (US); Jonathan Kokotajlo, Brooklyn, NY (US)

(73) Assignee: Zoom Communications, Inc., San Jose, CA (US)

( * ) Notice: Subject to any disclaimer, the term of this patent is extended or adjusted under 35 U.S.C. 154(b) by 0 days.

(21) Appl. No.: 17/973,959

(22) Filed: Oct. 26, 2022

(65) Prior Publication Data
US 2024/0146784 A1    May 2, 2024

(51) Int. Cl.
*H04L 65/403* (2022.01)
*H04L 12/18* (2006.01)

(52) U.S. Cl.
CPC ........ *H04L 65/403* (2013.01); *H04L 12/1818* (2013.01)

(58) Field of Classification Search
CPC .............. H04L 65/403; H04L 65/1066; H04L 65/1069; H04L 65/4076; H04L 12/18; H04L 47/82; H04L 51/10; H04L 51/12; H04L 51/16; H04L 51/36; H04L 51/046; H04M 3/56; H04N 7/15; G06F 17/2785
USPC ........................................................ 709/204
See application file for complete search history.

(56) References Cited

U.S. PATENT DOCUMENTS

| | | | |
|---|---|---|---|
| 9,191,615 B1 * | 11/2015 | Valimaki ................. | H04N 7/141 |
| 9,900,280 B2 * | 2/2018 | Geppert .............. | G06F 3/04842 |
| 10,536,422 B1 * | 1/2020 | Rao .......................... | H04L 51/10 |
| 10,863,230 B1 * | 12/2020 | Pham .................. | H04N 21/6547 |
| 11,055,305 B1 * | 7/2021 | Petricek ................ | G06F 16/252 |
| 11,343,293 B1 * | 5/2022 | Slotznick ................ | G06F 3/165 |
| 11,444,896 B1 * | 9/2022 | Kwon ..................... | H04L 51/216 |
| 2003/0039216 A1 * | 2/2003 | Sheldon .............. | H04L 12/1831 |
| | | | 370/260 |
| 2004/0039779 A1 * | 2/2004 | Armstrong ........... | H04L 12/1827 |
| | | | 709/236 |

(Continued)

OTHER PUBLICATIONS

U.S. Appl. No. 17/973,955 , "Final Office Action", Jun. 24, 2024, 18 pages.

(Continued)

*Primary Examiner* — James N Fiorillo
(74) *Attorney, Agent, or Firm* — Kilpatrick Townsend & Stockton LLP

(57) ABSTRACT

Techniques for overlaying messages are disclosed. In an example, a method involves receiving, from a first client participating as a first virtual participant in a first virtual meeting hosted by a virtual conference provider, a first message from a first messaging channel of the first virtual meeting. The method further involves receiving, from a second client participating as a second virtual participant in a second virtual meeting, a second message from a second messaging channel of the second virtual meeting. The method involves generating an overlay that includes the first and second messages. The method further involves modifying a first video stream of the first virtual conference based on the overlay. The method further involves outputting the modified first video stream to a third participant of the first or second virtual meeting.

14 Claims, 8 Drawing Sheets

(56) References Cited

U.S. PATENT DOCUMENTS

| | | | |
|---|---|---|---|
| 2006/0077205 A1* | 4/2006 | Guymon | H04L 51/04 345/473 |
| 2010/0223389 A1* | 9/2010 | Ananthanarayanan | H04M 3/56 709/229 |
| 2011/0279638 A1* | 11/2011 | Periyannan | H04N 7/141 348/14.09 |
| 2013/0311595 A1* | 11/2013 | Milatinovici | H04N 21/26275 709/214 |
| 2014/0067842 A1* | 3/2014 | Chen | G06F 16/367 707/758 |
| 2014/0136999 A1* | 5/2014 | Leibovich | H04N 21/6143 715/753 |
| 2014/0278367 A1* | 9/2014 | Markman | G06F 40/253 704/9 |
| 2015/0074555 A1* | 3/2015 | Yoon | H04L 12/1813 715/753 |
| 2016/0021039 A1* | 1/2016 | Woo | H04L 51/226 715/752 |
| 2016/0134568 A1* | 5/2016 | Woo | G06F 3/0484 709/206 |
| 2016/0269504 A1* | 9/2016 | Johar | H04L 67/141 |
| 2017/0195631 A1* | 7/2017 | Cahill | H04N 7/152 |
| 2017/0324624 A1* | 11/2017 | Taine | H04L 67/535 |
| 2018/0018079 A1* | 1/2018 | Monastyrshyn | H04N 21/44008 |
| 2018/0131878 A1* | 5/2018 | Charlton | H04N 5/272 |
| 2018/0165520 A1* | 6/2018 | Meisser | H04N 7/147 |
| 2018/0255007 A1* | 9/2018 | Ji | H04L 51/04 |
| 2019/0089657 A1* | 3/2019 | Girishankar | H04L 51/02 |
| 2019/0379712 A1* | 12/2019 | Mota | H04L 65/1089 |
| 2020/0007477 A1* | 1/2020 | Nair | H04L 65/1066 |
| 2020/0153915 A1* | 5/2020 | Jain | H04L 67/535 |
| 2020/0186576 A1* | 6/2020 | Gopal | H04L 65/1093 |
| 2020/0252442 A1* | 8/2020 | Brown | H04L 12/1818 |
| 2020/0259779 A1* | 8/2020 | Liu | H04L 51/10 |
| 2020/0412671 A1* | 12/2020 | Mathur | H04L 67/06 |
| 2021/0336911 A1* | 10/2021 | Naoi | H04L 51/04 |
| 2021/0390144 A1* | 12/2021 | B M S | H04L 65/4053 |
| 2021/0399911 A1* | 12/2021 | Jorasch | H04L 12/1818 |
| 2022/0030196 A1* | 1/2022 | Cahill | H04N 7/152 |
| 2022/0166953 A1* | 5/2022 | Aher | G06V 40/20 |
| 2022/0286314 A1* | 9/2022 | Meyer | H04L 12/1827 |
| 2023/0246857 A1* | 8/2023 | Boucheron | H04L 65/403 709/204 |
| 2023/0318999 A1* | 10/2023 | Lecesne | H04L 51/52 709/206 |
| 2023/0328203 A1* | 10/2023 | Chen | H04L 65/1089 |

OTHER PUBLICATIONS

U.S. Appl. No. 17/973,955, "Non-Final Office Action", Nov. 14, 2023, 15 pages.

* cited by examiner

CHAT OVERLAY IN VIDEO CONFERENCES

FIELD

This disclosure generally relates to video conferencing. More specifically, but not by way of limitation, this disclosure relates to overlaying messages from messaging channels on to video streams of video conferencing sessions and to moderation of questions identified in the messages.

DETAILED DESCRIPTION

Figure 1:
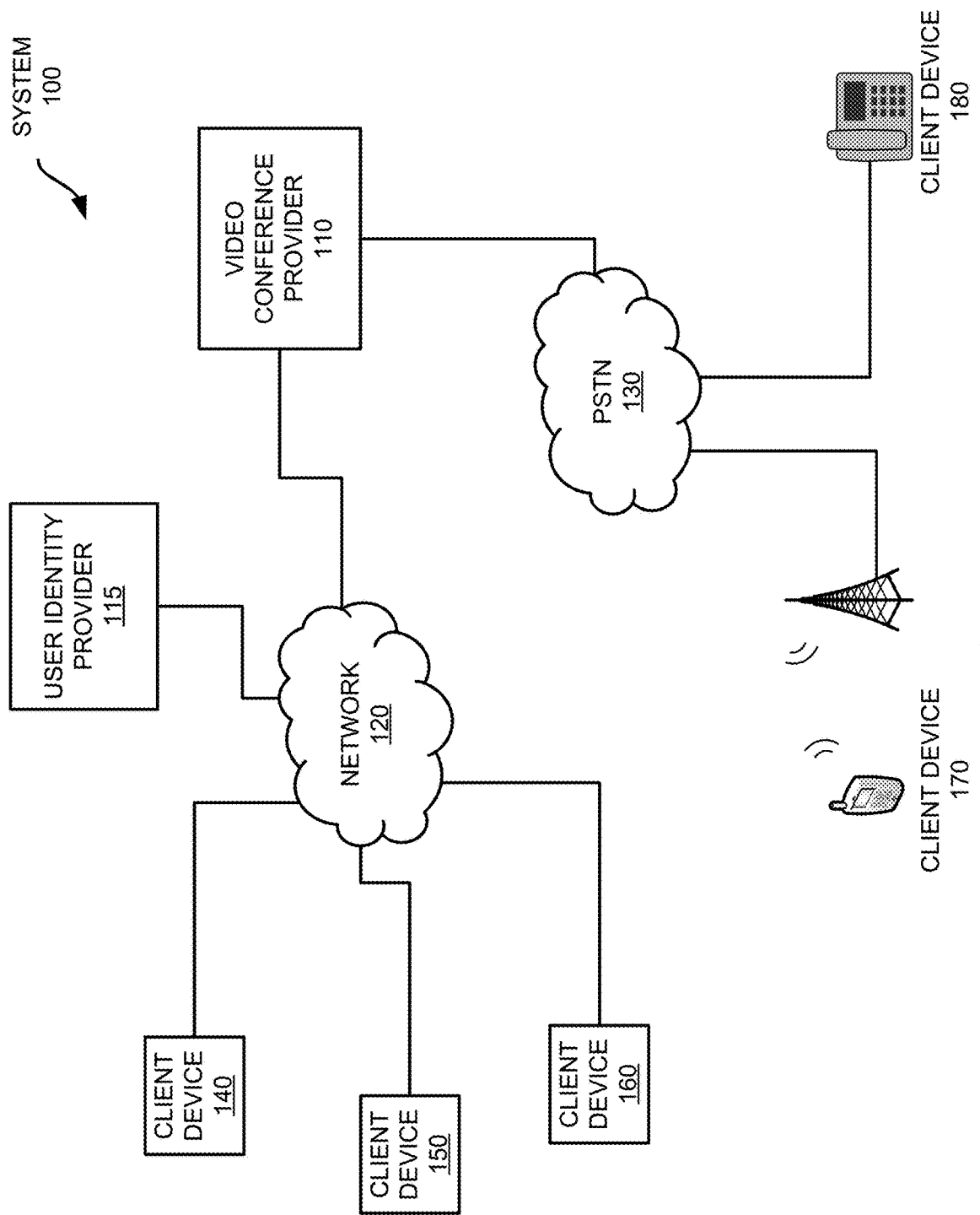
FIG. 1 depicts an example system for providing videoconferencing functionality to client devices.

Disclosed techniques relate to overlaying, in a visual manner, messages from messaging channels of video conferencing sessions onto video streams of video conferencing sessions. Overlaying involves obtaining messages from different video conferences, optionally performing intermediate processing on the messages, creating or updating an overlay with the messages, and modifying the conference video stream with the overlay such that video stream shows messages from multiple video conferences.

In some video conferences, messaging or chat functionality is actively used by many participants. For example, a video conference may have a separate messages pane or window in which chat messages are displayed. But sometimes, particularly in meetings with many participants, a number of messages can be overwhelming or watching the messaging pane for messages can detract from watching the main video stream. Moreover, in some types of meetings, such as webinars, meeting participants may be less interested in back-and-forth communication between each other, and more interested in simply reading comments from other users.

Accordingly, in some meetings, easier access to incoming messages from participants can be provided when the messages are overlayed onto the video stream of a video conferencing session, rather than simply being posted into a messaging channel, which is typically distinct from the video conference. In a simplified example introduced for discussion purposes, to provide chat overlay, the video conference provider can run video conference client software sessions, referred to as "listeners" or "agents," that will connect with the different meetings and obtain chat messages from those meetings. The listeners can then provide those messages to a messaging application, which can perform some intermediate processing such as filtering on the chat messages before creating or updating an overlay with the messages, and passing the overlay to the video conference provider, where the overlay is added to the video conferencing stream, displaying different messages from different video conference sessions.

For example, a first agent joins a first conferencing session to identify a message from a conference participant. A messaging application, which executes on a local device or a remotely-hosted server, receives the identified message, optionally filters the message, and creates or modifies an overlay. The overlay is passed to the video conferencing application, which adds the overlay to the existing video conference stream, and then transmits the modified stream to one or more clients. A second agent joins a second conferencing session to identify a message from another conference participant. The messaging application receives this additional message and modifies the overlay, which causes the video stream to be updated. Thus, chat messages can flow from multiple separate meetings, are aggregated, and ultimately presented on the video conference stream, in addition to or instead of being presented in a messaging window or pane of the video conference.

Additionally, disclosed techniques include real-time question moderation of questions identified in the messages. For example, the messaging application identifies questions from the messages obtained by the listeners and provides the questions to a moderator device. In turn, a moderator is able to select which questions should be added asked of a panelist or user and/or added to the overlay.

Turning now to the Figures, FIG. 1 depicts an example system 100 for providing videoconferencing functionality to client devices. In the example depicted by system 100, video conference provider 110 hosts one or more video conferences between client devices 140-180. The system 100 includes a video conference provider 110 that is connected to multiple communication networks 120, 130, through which various client devices 140-180 can participate in video conferences hosted by the video conference provider 110. For example, the video conference provider 110 can be located within a private network to provide video conferencing services to devices within the private network, or it can be connected to a public network, e.g., the internet, so it may be accessed by anyone. Other configurations include a hybrid model in which a video conference provider 110 may supply components to enable a private organization to host private internal video conferences or to connect its system to the video conference provider 110 over a public network.

System 100 optionally includes one or more user identity providers, e.g., user identity provider 115, which can provide user identity services to users of the client devices 140-160 and may authenticate user identities of one or more users to the video conference provider 110. In this example, the user identity provider 115 is operated by a different entity than the video conference provider 110, though in some examples, they may be the same entity.

Figure 2:
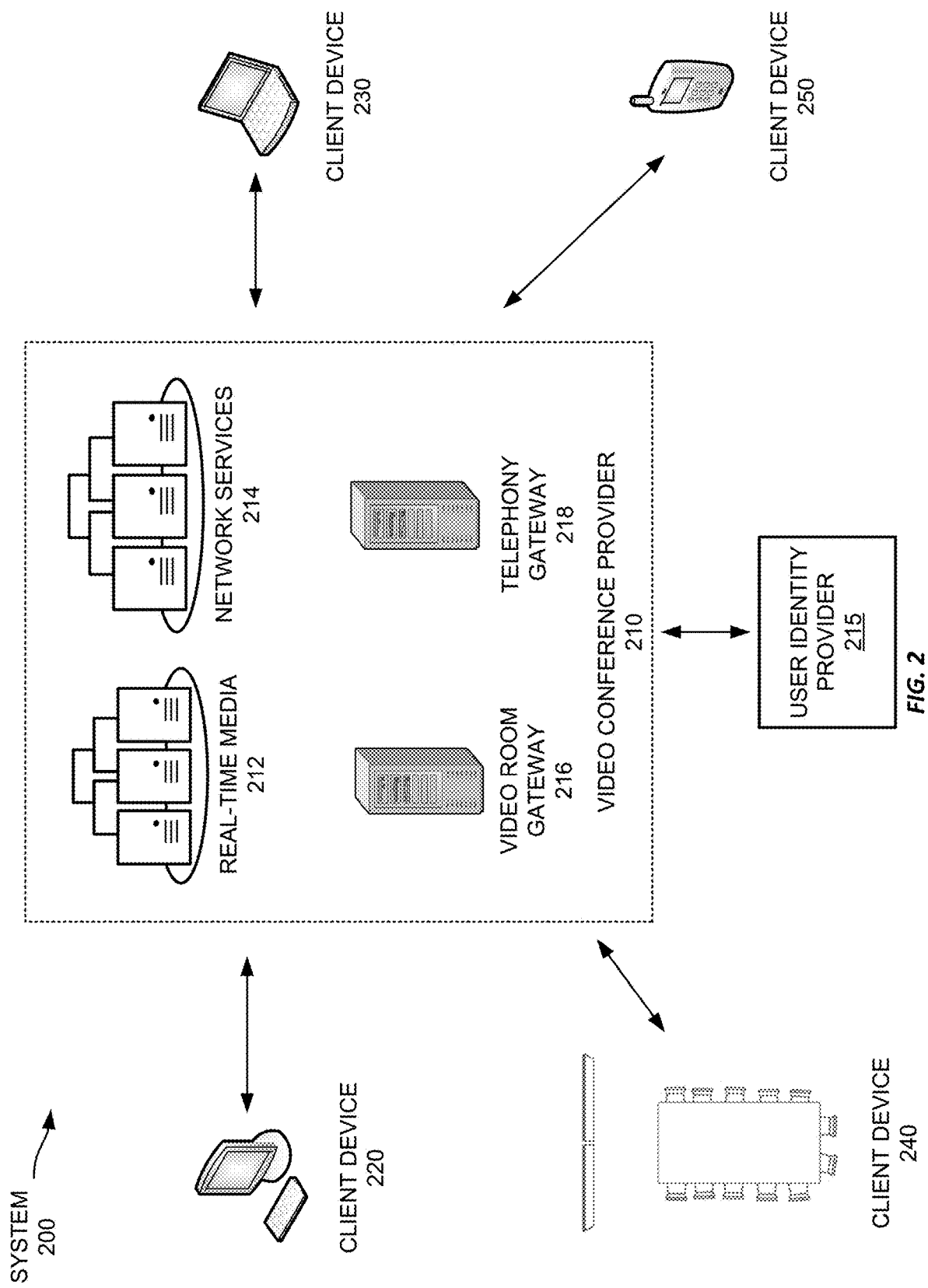
FIG. 2 depicts an example system in which a video conference provider provides videoconferencing functionality to various client devices.

Video conference provider 110 allows clients to create videoconference meetings (or "meetings") and invite others to participate in those meetings as well as perform other related functionality, such as recording the meetings, generating transcripts from meeting audio, generating summaries and translations from meeting audio, generating summaries and translations from meeting audio, manage user functionality in the meetings, enable text messaging during the meetings, create and manage breakout rooms from the main meeting, etc. FIG. 2, described below, provides a more detailed description of the architecture and functionality of the video conference provider 110. It should be understood that the term "meeting" encompasses the term "webinar" used herein.

Meetings facilitated by video conference provider 110 are provided in virtual rooms to which participants are connected. A room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used. Further, in some examples, and as alluded to above, a meeting may also have "a sidebar meeting." A sidebar meeting as provided herein may be a "room" that is associated with a "main" videoconference room or "main meeting."

To create a meeting with the video conference provider 110, a user may contact the video conference provider 110 using a client device 140-180 and select an option to create a new meeting. Such an option may be provided in a webpage accessed by a client device 140-180 or client application executed by a client device 140-180. For telephony devices, the user may be presented with an audio menu that they may navigate by pressing numeric buttons on their telephony device.

To create a meeting, the video conference provider 110 may prompt the user for certain information, such as a date, time, and duration for the meeting, a number of participants, a type of encryption to use, whether the meeting is confidential or open to the public, etc. After receiving the various meeting settings, the video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating the that meeting has not yet started or the host may be required to specifically admit one or more of the users.

During the meeting, the participants may employ their client devices 140-180 to capture audio or video information and stream that information to the video conference provider 110. They also receive audio or video information from the video conference provider 210, which is displayed by the respective client device 140-180 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting and they will no longer receive audio or video streams for the meeting (and will stop transmitting audio or video streams). The video conference provider 110 may also invalidate the meeting information, such as the meeting identifier or password/passcode.

To provide such functionality, one or more client devices 140-180 may communicate with the video conference provider 110 using one or more communication networks, such as communication network 120 or the public switched telephone network ("PSTN") 130. The client devices 140-180 may be any suitable computing or communications device that have audio or video capability. For example, client devices 140-180 may be conventional computing devices, such as desktop or laptop computers having processors and computer-readable media, connected to the video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the video conference provider 110. It should be appreciated that certain computing devices may also provide telephony functionality and may operate as telephony devices. For example, smartphones typically provide cellular telephone capabilities and thus may operate as telephony devices in system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can making conventional telephone calls and is not limited solely to dedicated telephony devices like conventional telephones.

Client devices 140-160 contact the video conference provider 110 using communication network 120 and may provide information to the video conference provider 110 to access functionality provided by the video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the video conference provider 110.

A user identity provider 115 may be any entity trusted by the video conference provider 110 that can help identify a user to the video conference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 115 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the video conference provider 110.

When the user accesses the video conference provider 110 using a client device, the video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the video conference provider 110 either provides or denies access to its services, respectively.

For telephony devices, e.g., client devices 170-180, the user may place a telephone call to the video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the video conference provider 110. For example, telephony devices may be unable to provide user identification information to identify the telephony device or the user to the video conference provider 110. Thus, the video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text messaging with other participants in the meeting.

It should be appreciated that users may choose to participate in meetings anonymously and decline to provide user identification information to the video conference provider 110, even in cases where the user has an authenticated identity and employs a client device capable of identifying the user to the video conference provider 110. The video conference provider 110 may determine whether to allow such anonymous users to use services provided by the video conference provider 110. Anonymous users, regardless of the reason for anonymity, may be restricted as discussed above with respect to users employing telephony devices, and in some cases may be prevented from accessing certain meetings or other services, or may be entirely prevented from accessing the video conference provider 110.

Referring again to video conference provider 110, in some examples, it may allow client devices 140-160 to encrypt their respective video and audio streams to help improve privacy in their meetings. Encryption may be provided between the client devices 140-160 and the video conference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the video conference provider 110, while allowing the video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

FIG. 2 depicts an example system 200 in which a video conference provider 210 provides videoconferencing functionality to various client devices 220-250. The client devices 220-250 include two conventional computing devices 220-230, dedicated equipment for a video conference room 240, and a telephony device 250.

Each client device 220-250 communicates with the video conference provider 210 over a communications network, such as the internet for client devices 220-240 or the PSTN for client device 250, generally as described above with respect to FIG. 1. The video conference provider 210 is also in communication with one or more user identity providers 215, which can authenticate various users to the video conference provider 210 generally as described above with respect to FIG. 1.

In this example, the video conference provider 210 employs different servers (or groups of servers) to provide video conference functionality. The video conference provider 210 uses one or more real-time media servers 212, one or more network services servers 214, one or more video room gateways 216, and one or more telephony gateway servers 218. Each of these servers 212-218 is connected to one or more communications networks to enable them to collectively provide access to and participation in one or more video conference meetings to the client devices 220-250.

Real-time media servers 212 provide multiplexed multimedia streams to meeting participants, such as client devices 220-250. While video and audio streams typically originate at the respective client devices, they are transmitted from the client devices 220-250 to the video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex the video from client device 220 and audio feeds when transmitting streams to client device 220. Instead each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the video conference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the video conference provider 210 may allow a meeting participant to notify it of inappropriate behavior or content in a meeting. Such a notification may trigger the real-time media servers to 212 record a portion of the meeting for review by the video conference provider 210. Still other functionality may be implemented to take actions based on the decrypted multimedia streams at the video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the video conference provider 210 via real-time media servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference provider 210 and across many different real-time media servers 212.

Network services servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the video conference provider under a supervisory set of servers. When a client device 220-250 accesses the video conference provider 210, it will typically communicate with one or more network services servers 214 to access their account or to participate in a meeting.

When a client device 220-250 first contacts the video conference provider 210 in this example, it is routed to a network services server 214. The client device may then provide access credentials for a user, e.g., a username and password or single sign-on credentials, to gain authenticated access to the video conference provider 210. This process may involve the network services servers 214 contacting a user identity provider 215 to verify the provided credentials. Once the user's credentials have been accepted, the network services servers 214 may perform administrative functionality, like updating user account information, if the user has an identity with the video conference provider 210, or scheduling a new meeting, by interacting with the network services servers 214.

In some examples, users may access the video conference provider 210 anonymously. When communicating anonymously, a client device 220-250 may communicate with one or more network services servers 214 but only provide information to create or join a meeting, depending on what features the video conference provider allows for anonymous users. For example, an anonymous user may access the video conference provider using client device 220 and provide a meeting ID and passcode. The network services server 214 may use the meeting ID to identify an upcoming or on-going meeting and verify the passcode is correct for the meeting ID. After doing so, the network services servers 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services servers 214 may accept requests to join the meeting from various users.

To handle requests to join a meeting, the network services servers 214 may receive meeting information, such as a meeting ID and passcode, from one or more client devices 220-250. The network services servers 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services servers 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services servers 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services servers 214.

After joining a meeting, client devices will send and receive multimedia streams via the real-time media servers 212, but they may also communicate with the network services servers 214 as needed during meetings. For example, if the meeting host leaves the meeting, the network services servers 214 may appoint another user as the new meeting host and assign host administrative privileges to that user. Hosts may have administrative privileges to allow them to manage their meetings, such as by enabling or disabling screen sharing, muting or removing users from the meeting, assigning or moving users to the mainstage or a breakout room if present, recording meetings, etc. Such functionality may be managed by the network services servers 214.

For example, if a host wishes to remove a user from a meeting, they may identify the user and issue a command through a user interface on their client device. The command may be sent to a network services server 214, which may then disconnect the identified user from the corresponding real-time media server 212.

In addition to creating and administering on-going meetings, the network services servers 214 may also be responsible for closing and tearing-down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services servers 214 may deny the request.

Depending on the functionality provided by the video conference provider, the network services servers 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these video room gateway servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the video conference provider 210. For example, the video conferencing hardware may be provided by the video conference provider to one or more of its subscribers, which may provide access credentials to the video conferencing hardware to use to connect to the video conference provider 210.

The video room gateway servers 216 provide specialized authentication and communication with the dedicated video conferencing hardware that may not be available to other client devices 220-230, 250. For example, the video conferencing hardware may register with the video conference provider when it is first installed and the video room gateway may authenticate the video conferencing hardware using such registration as well as information provided to the video room gateway servers 216 when dedicated video conferencing hardware connects to it, such as device ID information, subscriber information, hardware capabilities, hardware version information etc. Upon receiving such information and authenticating the dedicated video conferencing hardware, the video room gateway servers 216 may interact with the network services servers 214 and real-time media servers 212 to allow the video conferencing hardware to create or join meetings hosted by the video conference provider 210.

The telephony gateway servers 218 enable and facilitate telephony devices' participation in meetings hosed by the video conference provider 210. Because telephony devices communicate using the PSTN and not using computer networking protocols, such as TCP/IP, the telephony gateway servers 218 act as an interface that converts between the PSTN and the networking system used by the video conference provider 210.

For example, if a user uses a telephony device to connect to a meeting, they may dial a phone number corresponding to one of the video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212, and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3:
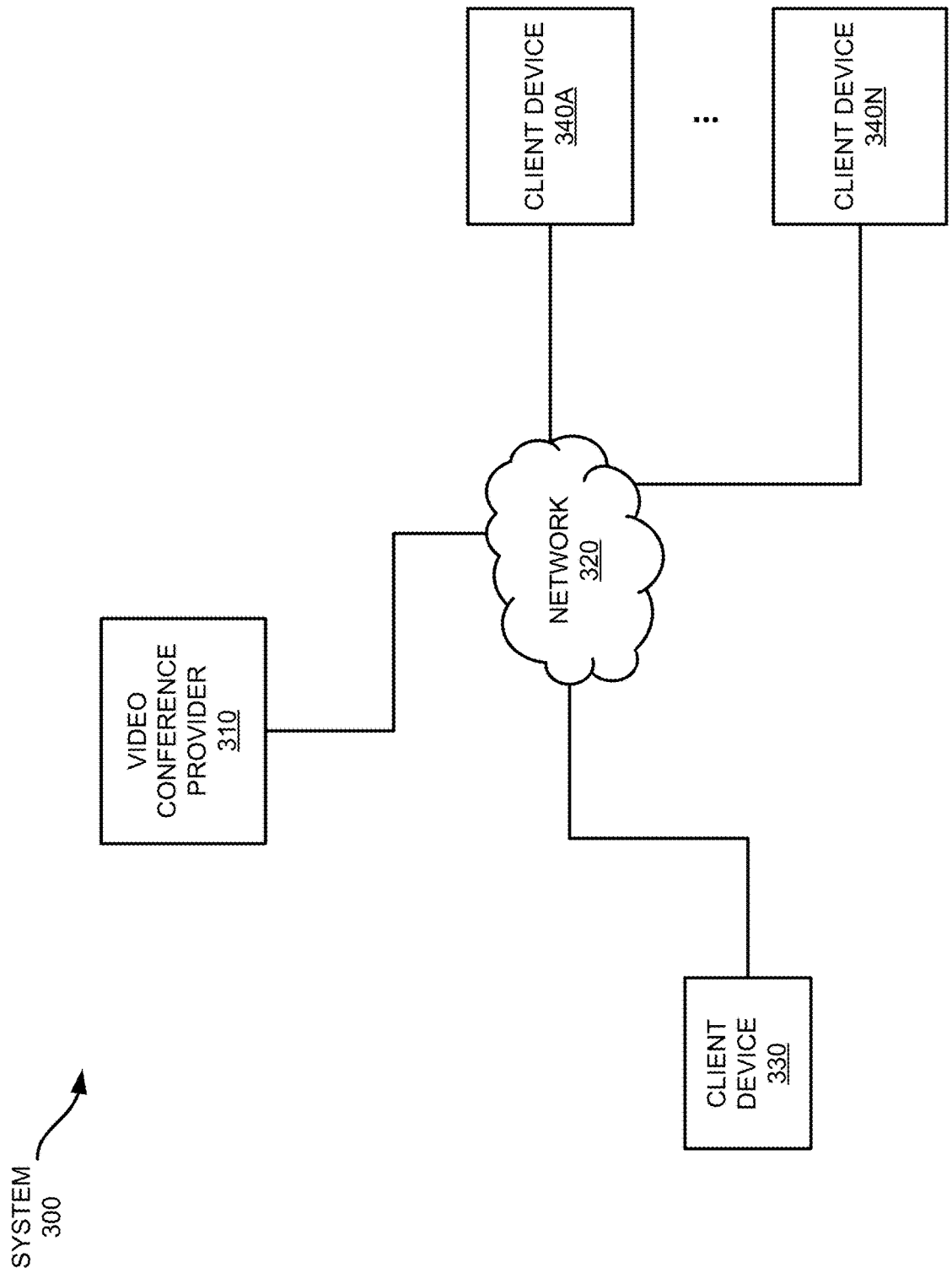
FIG. 3 depicts an example system for providing chat overlay in video conferences.

FIG. 3 depicts an example system 300 for providing chat overlay in video conferences. The system 300 shown in FIG. 3 includes a video conference provider 310 and multiple client devices 330 and 340A-N that are connected to the video conference provider 310 via network 320. In this example, the network 320 is the internet; however, any communications network or combination of communications networks may be employed. While system 300 is depicted as including multiple client device 330, 340A-N, it should be appreciated that some example systems may not include any client devices at any particular time.

To start a meeting, the host client device 330 connects to the video conference provider 310 and begins a main meeting ("meeting") at the video conference provider 310, such as by beginning a scheduled meeting, generally as described above with respect to FIGS. 1 and 2. The video conference provider 310 may create and manage the meeting as discussed above. Any of client devices 330, or 340A-N may start or join additional meetings.

System 300 can also implement can identify chat messages from multiple meetings and create an overlay that can then be used to modify one or more video streams. For example, client devices 330 or 340A-N can join or host video conferencing sessions and can execute one or more agents (not depicted). In turn, the agents can join messaging channels of the host video conferencing sessions to obtain messages that are posted by participants. In some cases, the video conferencing sessions can be hosted elsewhere, for example, on one or more servers at the video conference provider 310, and the agents may join a session via one or more of the client devices 330 or 340A-N. In some examples, the video conference provider 310 may execute one or more agents instead of, or in addition to, agents executed by the client device 330, 340A-N.

Figure 4:
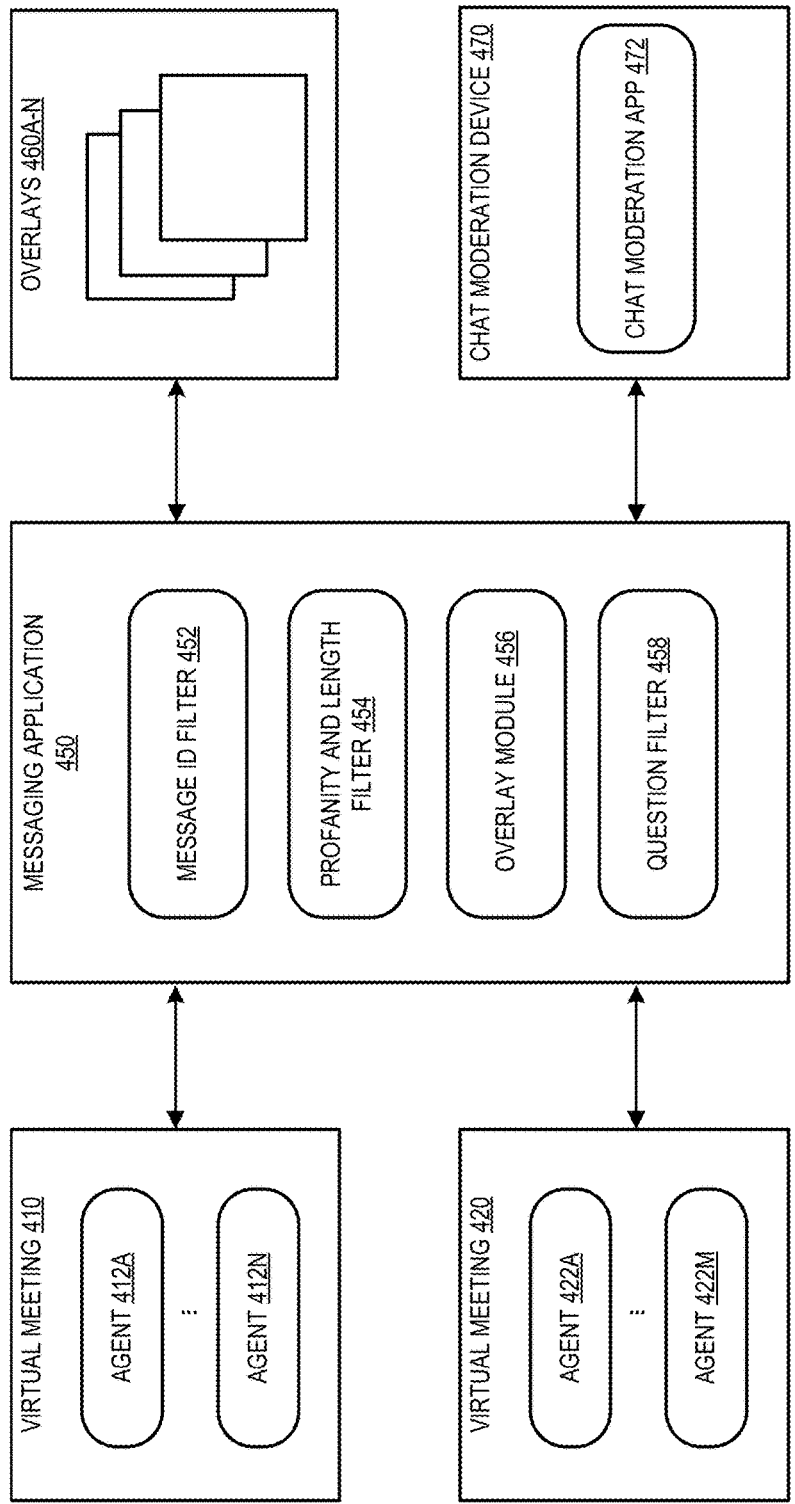
FIG. 4 depicts an example system for providing chat overlay in video conferences.

Once the client devices have joined their respective meetings, the agents can obtain chat messages exchanged within a meeting and provide them to a messaging application, as discussed further with respect to FIG. 4. The messaging application can be hosted by the video conference provider 310. The messaging application can filter messages based on various criteria and can also implement question filtering and moderation.

The messages obtained via the agents are added to an overlay, which is combined in a visual manner with one or more video conference streams accessed by client devices 330 or 340A-N. In some cases, the video stream is provided as a dedicated stream, i.e., outside the video conferencing software. System 300 can also filter messages before overlaying and implement question moderation of questions identified in the messages.

FIG. 4 depicts an example system 400 for providing chat overlay in video conferences. FIG. 4 includes a set of agents 412A-N connected to virtual meeting 410, another set of agents 422A-M connected to virtual meeting 420, messaging application 450, overlays 460A-N, and chat moderation device 470. In the example depicted in FIG. 4, agents 412A-N and 422A-M in virtual meetings 410 and 420 obtain messages and provide those messages to messaging application 450, which in turn can generate one or more overlays 460A-N using the messages and/or provide chat moderation via chat moderation device 470.

While system 400 depicts two virtual meetings 410 and 420, obtaining messages from any number of meetings is possible. Further, the functionality provided by virtual meetings 410 and 420, messaging application 450, and chat moderation device 470 can be provided by one or more servers or client devices.

In a simplified example, an organization configures virtual meeting 410 as a first session (e.g., for panelists and presenters) and configures virtual meeting 420 as a second session (e.g., for remote attendees). One or more agents obtain messages from the messaging channels of virtual meeting 410 and virtual meeting 420, and pass the messages to messaging application 450, which on a video stream of a virtual meeting. For example, agent 412B joins virtual meeting 410 and listens for messages. Upon detecting a message in virtual meeting 410, agent 412B transmits the message to messaging application 450. Similarly, agent 422A joins virtual meeting 420 and listens for messages. Upon detecting a message in virtual meeting 420, agent 422A transmits the message to messaging application 450. Messaging application 450 receives and aggregates messages from multiple agents and can create overlays 460A-N with the messages.

Messaging application 450 includes message ID filter 452, profanity and length filter 454, overlay module 456, and question filter 458. Message ID filter 452 can filter messages identified for placement on an overlay and/or question moderation based on one or more criteria. For example, message filtering can be performed based on an identifier (ID) of the user or participant in the conference. It may be desirable that the messages from certain users are not propagated. For example, messages from certain designated users such as panelists who are speaking among themselves would be disruptive if propagated to a wider audience. Similarly, messages from agents are not propagated. Therefore, message ID filter 452 can detect whether a message originated from a user of the video conference as opposed to an agent.

Further, message ID filter 452 can filter messages to ensure that messages are not identified for placement on an overlay and/or question moderation more than once. This type of filtering can be based on a message sent list. For instance, when a message is captured by an agent, the message is added to a sent list such that the message is not propagated a second time and does not bounce back and forth between the virtual meetings. Accordingly, messages that have already been added to the overlay can be ignored.

In another example, filtering is performed such that an individual agent only listens to for messages from users that are assigned to that agent. For instance, if a given virtual meeting has 100 users and five agents are assigned to cover the messages posted by the users, then each agent can handle messages from a predetermined 20 users.

Profanity and length filter 454 can filter incoming messages to remove profanity or objectionable content. Algorithmic or predictive approaches can be used. For example, a known word list can be used to check whether any known offensive words are in a message. In some cases, one or more predictive or machine learning models. Examples of suitable models include predictive models and classifiers (e.g., linear classifiers, support vector machines (SVM), decision trees, k-nearest neighbor models, and random forest models). The models are used for identifying and/or removing inappropriate or harmful content in messages. In some cases, an external profanity filtering service or API can be used.

Profanity and length filter 454 can also filter messages based on length. Messages that are too long can be disruptive or distracting when added to an overlay on a video stream. Accordingly, if an incoming message is greater than a threshold length, then action can be taken such as not propagating the message further or truncating the message to be within the threshold length.

Overlay module 456 within messaging application 450 creates one or more overlays 460A-N from the messages gathered by the agents and optionally filtered by message ID filter 452 and/or profanity and length filter 454. An overlay includes a graphical representation of one or more of the chat messages that can be visually combined with a video conference stream so that the chat messages are positioned overtop of a participant's video stream. The combination can involve superimposing the pixels corresponding to the overlay onto the corresponding pixels of the video conference stream for a period of time. For example, if a video conference stream includes a video stream of speaker and a background, a combination of an overlay with the video stream would include the speaker, background, and the messages.

The message text can be overlayed in a variety of different patterns. For example, only one message, e.g., the latest message can be displayed at once. In another example, the messages are delivered in a scrolling form, for example, upwards from the bottom of the screen in order of arrival. Continuing the example, a first message is positioned within the overlay at a first position. Then, when a second message arrives, the first message is re-positioned at a second position and the second message is positioned at the first position, and so forth. When a message is added or repositioned, the overlay is modified and a video stream is updated.

In some examples the overlay may include graphical features to help it stand out from the speaker's video feed, such as a border or by flashing or otherwise emphasizing new overlaid chat messages, such as by presenting them in large font, and deemphasizing older chat messages, such as by reducing font size or increasing their transparency until they fade from view.

Overlays 460A-N can be displayed on one or more of streams received by the video conference clients. In one example, only a subset of conference participants receive a video stream with the overlays 460A-N, and another subset of the conference participants receive an unmodified stream. Additionally or alternatively, multiple overlays 460A-N can be created for video streams with different aspect ratios (e.g., 4:3, 3:4, 16:9, and 9:16) and be output simultaneously.

Different implementations are possible. In some implementations, the overlays 460A-N are received by the client devices, which in turn add the overlay to the video stream (which is generally received from a video conference provider). In another implementation, the video conference provider receives the overlays 460A-N from messaging application 450, and updates one or more video streams with the overlays before sending the video streams to the client devices.

Figure 7:
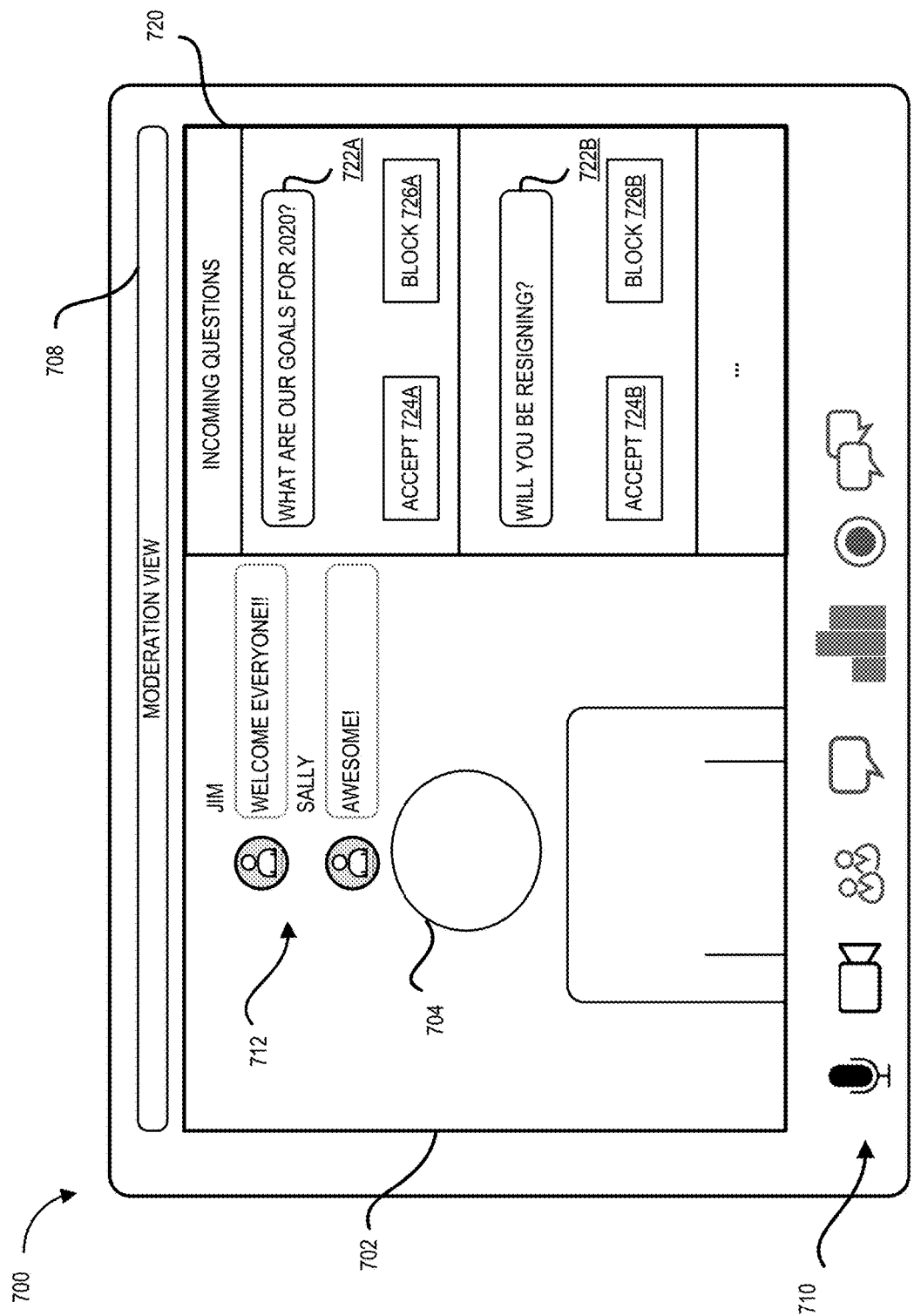
FIG. 7 depicts an example of a GUI of a moderation view of a video conference application.

Question filter 458 extracts questions from the messages gathered by the agents and optionally filtered by message ID filter 452 and/or profanity and length filter 454. Question filter 458 can use different techniques to identify questions from messages, such as algorithmic-based or machine-learning based techniques. Identified questions are provided to chat moderation device 470, which can execute chat moderation application 472. An example GUI implemented by chat moderation application 472 is depicted in FIG. 7. Other GUIs are possible.

Chat moderation application 472 provides a mechanism by which a moderator, who can be using chat moderation device 470 in a different location, can receive questions in real-time and provide a selection of a question. When a question is selected, the overlay can be updated to include the question and/or the question can be provided on a separate device for a user or panelist to answer (not depicted).

In some cases, disclosed techniques include bridging messaging channels between messaging channels of separate video conferencing sessions such that users can communicate with each other as if the sessions were one, in addition to the message overlay features described herein. Bridging messaging channels can include a cross-posting of messages between the messaging channels.

For example, one or more agents 412A-N can join virtual meeting 410 and one or more agents 422A-M can join virtual meeting 420. Agents can each have an identity that can appear in the messaging channel or in a list of participants. For example, in some cases an agent may be identified to other users as an "Agent." In some examples, agents may be hidden from the other participants so they do not serve as a distraction. In other cases, an agent may change its identity, for example to "Sam," for message cross-posting purposes so that messages appear to originate with the original poster, rather than an agent. While agents are used herein for discussion purposes, other approaches to accessing messages in messaging channels of video conferences can be employed.

In another example, an organization configures virtual meeting 410 as a first session (e.g., for panelists and presenters) and configures virtual meeting 420 as a second session (e.g., for remote attendees). Bridging of the messaging channels of virtual meeting 410 and virtual meeting 420 is desired. Agent 412A joins virtual meeting 410 and listens for messages. Upon detecting a message from a first user, one of the agent's assigned users, agent 412A passes the message to messaging application 450. Messaging application 450 propagates the message to agent 422A, which in turn posts the message in virtual meeting 420. Similarly, agent 422A joins virtual meeting 420 and, upon detecting a message from a user associated with it, the agent 422A passes the message to the messaging application 450, which propagates the message to agent 412A, which in turn posts the message in virtual meeting 420.

Figure 5:
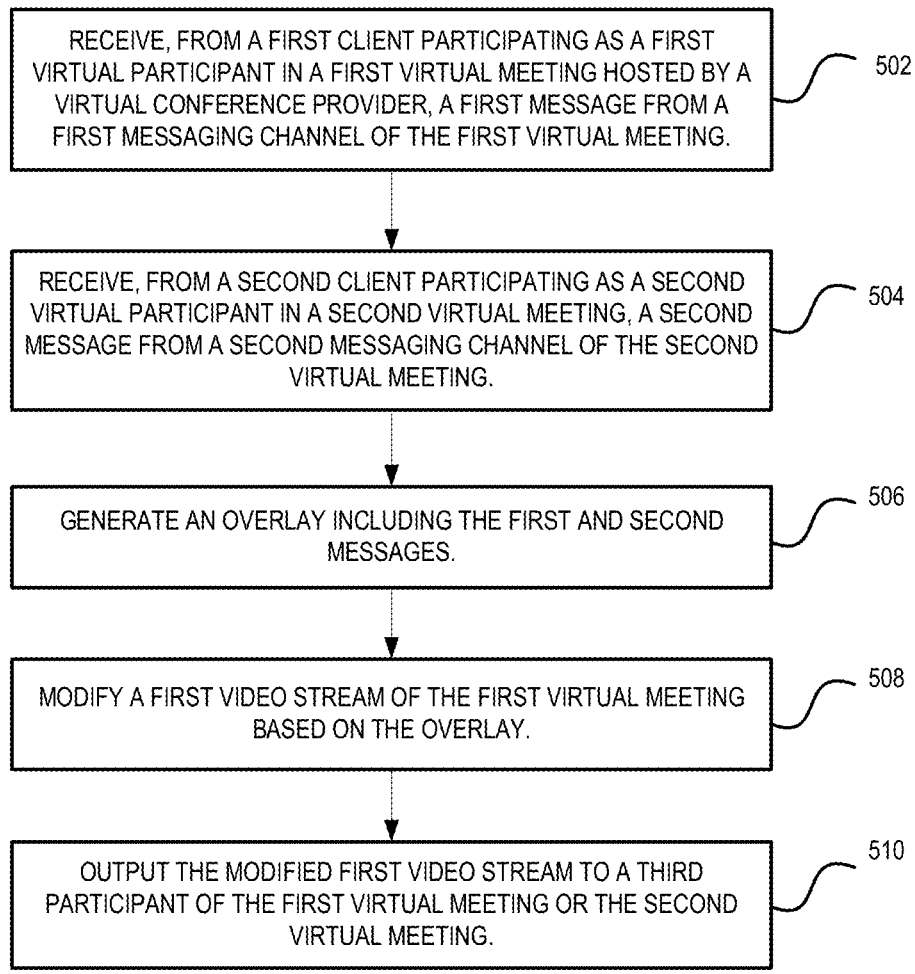
FIG. 5 depicts a flowchart of an example of a method for providing chat overlay in video conferences.

FIG. 5 depicts a flowchart of an example of a method for providing chat overlay in video conferences. Method 500 can be implemented by one or more of video conference provider 310, client devices 340A-N, or any other systems.

It should be appreciated that method 500 provides a particular method for chat overlay in video conferences. Other sequences of operations may also be performed according to alternative examples. For example, alternative examples of the present invention may perform the steps outlined above in a different order. Moreover, the individual operations illustrated by method 500 may include multiple sub-operations that may be performed in various sequences as appropriate to the individual operation. Furthermore, additional operations may be added or removed depending on the particular applications. Further, the operations described in method 500 may be performed by different devices. For instance, an application may transmit directly to a video conference provider and/or via a client software. One of ordinary skill in the art would recognize many variations, modifications, and alternatives.

At block 502, method 500 involves receiving, from a first client participating as a first virtual participant in a first virtual meeting hosted by a virtual conference provider, a first message from a first messaging channel of the first virtual meeting. For example, virtual meeting 410 has a first set of participants and the first messaging channel which provides text messaging between the first set of participants. Messaging application 450 receives, from an agent 412A connected to virtual meeting 410, a first message that was posted by a first participant of the first set of participants (e.g., not by an agent).

At block 504, method 500 involves receiving, from a second client participating as a second virtual participant in a second virtual meeting, a second message from a second messaging channel of the second virtual meeting. Continuing the example, virtual meeting 420 has a second set of participants and a second messaging channel, which provides text messaging between the second set of participants. Messaging application 450 receives, from another agent 422A connected to virtual meeting 420, a second message that was posted by a second participant of the second set of participants. Optionally, the message is passed through the message ID filter 452 and/or the profanity and length filter 454.

At block 506, method 500 involves generating an overlay including the first and second messages. An overlay is created as discussed with respect to the overlay module 456 of FIG. 4.

At block 508, method 500 involves modifying a first video stream of the first virtual meeting based on the overlay. Continuing the example, messaging application 450 modifies the video stream of virtual meeting 410 with the overlay generated at block 506. In an example, the video conference provider can receive the overlay and in turn modify the video stream to include the received overlay as well as one or more chat messages, which may be received directly from the messaging application 450 or instead from the chat moderation device 470, before transmitting the video stream to the client devices, such as described above with respect to FIG. 4.

At block 510, method 500 involves outputting the modified first video stream to a third participant of the first virtual meeting or the second virtual meeting. Continuing the example, the modified video stream generated at block 508 is provided to the virtual meeting 410 or 420. An example of an output video stream is provided in FIG. 6. Method 500 can continue while the meeting is in session, continuing to update the overlay and modify the video stream with newly-identified messages from the virtual meetings.

Figure 6:
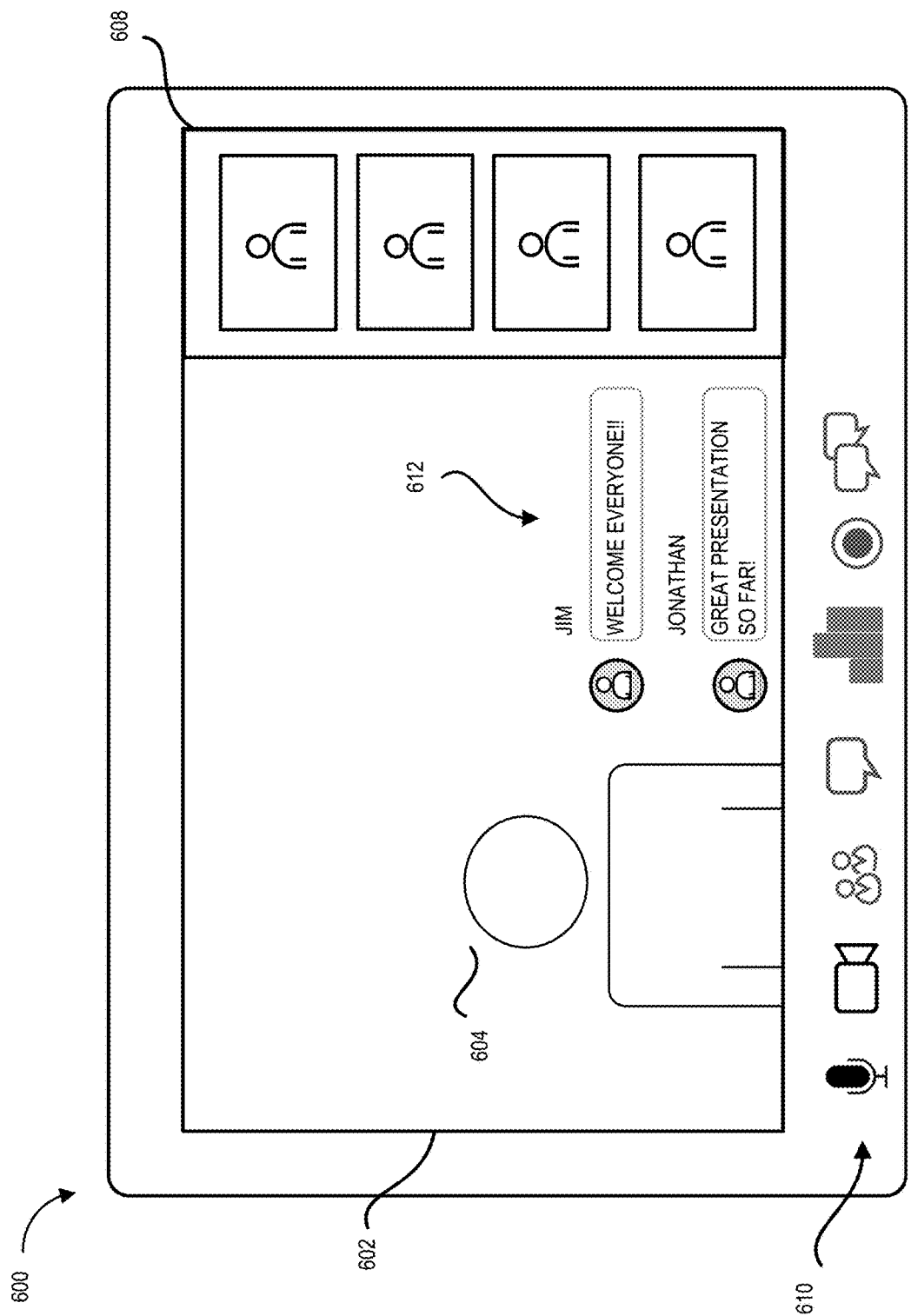
FIG. 6 depicts an example of a Graphical User Interface (GUI) of a video conference including a messaging overlay.

FIG. 6 depicts an example of Graphical User Interface (GUI) 600 of a video conference including a messaging overlay. GUI 600 includes display 602, participant list 608, and conference controls 610.

As can be seen, display 602 shows a video conference stream including participant 604 and overlay 612. Overlay 612 includes various overlayed messages such as "Good morning!" from Jim, who is in a first meeting, and "Great presentation so far," from Jonathan, who is in a second meeting. While the users Jim and Jonathan are in two different meetings, overlaying messages any number of meetings is possible.

In some cases, the messages on overlay 612 can scroll as new messages appear. In the example depicted, the messages are shown scrolling upwards, but scrolling in any direction is possible.

Participant list 608 shows some or all of the participants in the virtual conference. Conference controls 610 can include controls such as mute, turn on or off camera, messaging, analytics, recording selection, and so forth. Other controls and elements may be present in other examples. As depicted, the overlay 612 is shown to the right of participant 604, but the overlay 612 can be displayed anywhere in the display 602, in another window, or on another device.

FIG. 7 depicts an example of Graphical User Interface (GUI) 700 of a moderation view of a video conference application. GUI 700 includes display 702, participant list 708, and conference controls 710.

As can be seen, display 702 shows a video conference stream including participant 704 and overlay 712. Overlay 712 includes various overlayed messages such as "Welcome everyone!," from Jim, who is in a first meeting, and "Awesome," From Sally who is in a second meeting. While the users Jim and Sally are in two different meetings, overlaying messages any number of meetings is possible.

In some cases, the messages on overlay 612 can scroll as new messages appear. In the example depicted, the messages are shown scrolling upwards, but scrolling in any direction is possible. As depicted, the overlay 712 is shown above the participant 704, but the overlay 712 can be displayed anywhere in the display 702, in another window, or on another device.

Participant list 708 shows some or all of the participants in the virtual conference. Conference controls 710 can include controls such as mute, turn on or off camera, messaging, analytics, recording selection, and so forth. Other controls and elements may be present in other examples.

Moderator dashboard 720 provides the moderator the capability to quickly make decisions with to whether incoming questions identified from messages should be accepted or denied. Moderator dashboard 720 includes one or more incoming questions. While two incoming questions 722A-B are shown, any number of incoming questions is possible. Each incoming question 722A-B has a corresponding "Accept" interface element 724A-B and "Block" interface element 726A-B.

When a question arrives, the moderator can accept the question by clicking on the appropriate "Accept" element or reject the question by clicking on the appropriate "Block" element. If the question is accepted, then the question is forwarded to the overlay and/or forwarded to dedicated screen or device on which another who can answer the question may view the view the question. If the question is blocked, then the question is not added to the overlay and/or is not provided to the dedicated screen or device.

Figure 8:
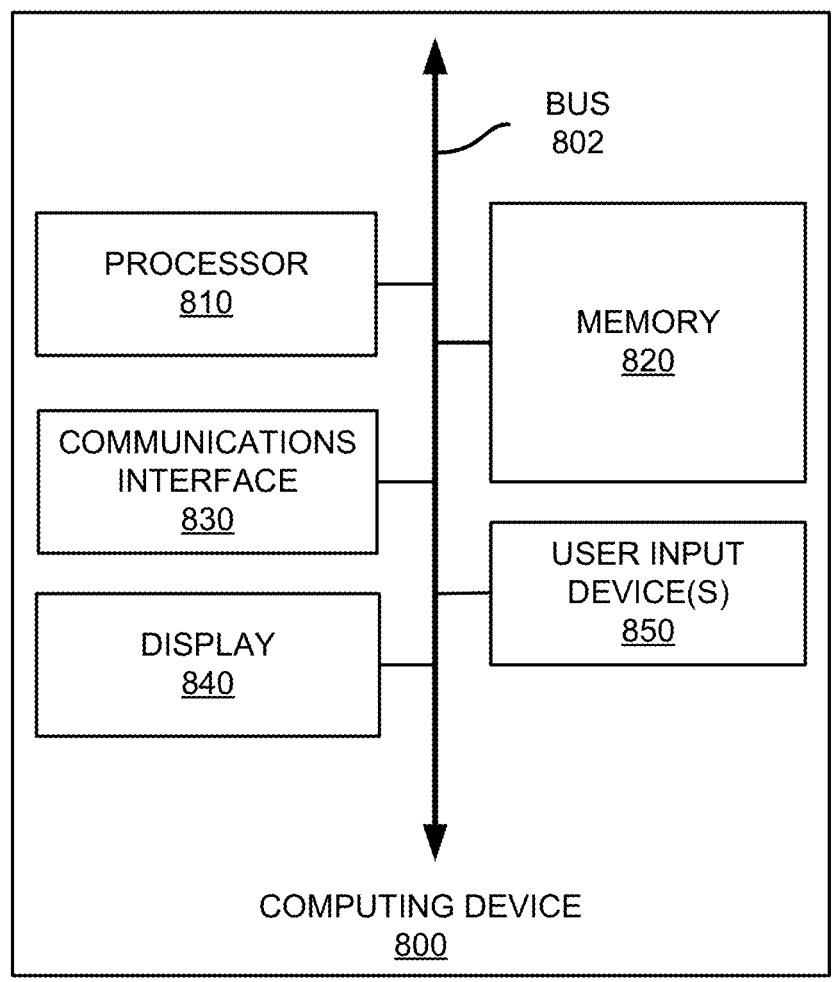
FIG. 8 illustrates an example computing device for messaging overlay and question moderation.

FIG. 8 illustrates an example computing device 800 for messaging overlay and question moderation. Computing device 800 is suitable for use in example systems or methods described herein. Computing device 800 includes a processor 810 which is in communication with the memory 820 and other components of the computing device 800 using one or more communications buses 802.

The processor 810 is configured to execute processor-executable instructions stored in the memory 820 to perform one or more methods described herein, such as part or all of the method, described above. The computing device, in this example, also includes one or more user input devices 850, such as a keyboard, mouse, touchscreen, video input device (e.g., one or more cameras), microphone, etc., to accept user input. The computing device 800 also includes a display 840 to provide visual output to a user.

The computing device 800 also includes a communications interface 830. In some examples, the communications interface 830 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

A method including: receiving, from a first client participating as a first virtual participant in a first virtual meeting of a plurality of virtual meetings hosted by a virtual conference provider, a first message from a first messaging channel of the first virtual meeting, wherein: the first virtual meeting has a first plurality of participants and the first messaging channel, the first messaging channel provides text messaging between the first plurality of participants, and the message was posted by a first participant of the first plurality of participants; receiving, from a second client participating as a second virtual participant in a second virtual meeting of the plurality of virtual meetings, a second message from a second messaging channel of the second virtual meeting, wherein: the second virtual meeting has a second plurality of participants and the second messaging channel, the second messaging channel provides text messaging between the second plurality of participants, and the message was posted by a second participant of the second plurality of participants; generating an overlay including the first and second messages; modifying a first video stream of the first virtual meeting based on the overlay; and outputting the modified first video stream to a third participant of the first virtual meeting or the second virtual meeting.

Illustration 2 is the method of any previous or subsequent illustration, further including: positioning, within the overlay, the first message at a first position and the second message at a second position, wherein the first position is above the second position.

Illustration 3 is the method of any previous or subsequent illustration, further including: receiving, from either the first client or the second client, an additional message from an additional participant; updating the overlay to include the additional message; and modifying the first video stream based on the updated overlay.

Illustration 4 is the method of any previous or subsequent illustration, wherein the first video stream includes a first aspect ratio, the method further including: generating an additional overlay including the first and second messages; modifying an additional video stream based on the additional overlay; and outputting the modified additional video stream, wherein the modified additional video stream includes a second aspect ratio that is different from the first aspect ratio.

Illustration 5 is the method of any previous or subsequent illustration, further including: identifying that the first message or the second message includes a question; and responsive to the identifying, transmitting the question to a moderator device.

Illustration 6 is the method of any previous or subsequent illustration, further including: receiving, from the moderator device, a selection of the question; and responsive to receiving the selection, updating the overlay to include the question; and modifying the first video stream based on the updated overlay.

Illustration 7 is the method of any previous or subsequent illustration, further including: identifying, from the first message and the second message, a message including text that is inappropriate or harmful; and responsive to the identifying, removing the text from the message.

The above examples may be implemented on a system including a processor and/or on a non-transitory computer-readable medium. These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification.

That which is claimed is:

1. A method comprising:
receiving, from a first client participating as a first virtual participant in a first virtual meeting of a plurality of virtual meetings hosted by a virtual conference provider, a first message from a first messaging channel of the first virtual meeting, wherein:
the first virtual meeting has a first plurality of participants and the first messaging channel,
the first messaging channel provides text messaging between the first plurality of participants, and
the message was posted by a first participant of the first plurality of participants;
receiving, from a second client participating as a second virtual participant in a second virtual meeting of the plurality of virtual meetings, a second message from a second messaging channel of the second virtual meeting, wherein:
the second virtual meeting has a second plurality of participants and the second messaging channel,
the second messaging channel provides text messaging between the second plurality of participants, and
the message was posted by a second participant of the second plurality of participants;
determining that the first message or the second message comprises a question;
transmitting the question to a moderator device;
receiving, from the moderator device, an indication to present the question;
generating a visual overlay comprising the question;
modifying a first video stream of the first virtual meeting based on the visual overlay, wherein pixels corresponding to the visual overlay are superimposed onto pixels of the first video stream enabling at least a portion of the question to be visually combined with the first video stream; and
outputting the modified first video stream to a third participant of the first virtual meeting.

2. The method of claim 1, further comprising: positioning, within the visual overlay, the first message at a first position and the second message at a second position, wherein the first position is above the second position.

3. The method of claim 1, further comprising:
receiving, from either the first client or the second client, an additional message from an additional participant;
updating the visual overlay to include the additional message; and
modifying the first video stream based on the updated visual overlay.

4. The method of claim 1, wherein the first video stream comprises a first aspect ratio, the method further comprising:
generating an additional visual overlay comprising the first and second messages;
modifying an additional video stream based on the additional visual overlay; and
outputting the modified additional video stream, wherein the modified additional video stream comprises a second aspect ratio that is different from the first aspect ratio.

5. The method of claim 1, further comprising:
identifying, from the first message and the second message, a message comprising text that is inappropriate or harmful; and
responsive to the identifying, removing the text from the message.

6. A system comprising:
a non-transitory computer-readable medium; and
one or more processors communicatively coupled to the non-transitory computer-readable medium, the one or more processors configured to execute processor-executable program instructions stored in the non-transitory computer-readable medium, the processor-executable program instructions configured to cause the one or more processors to:
receive, from a first client participating as a first virtual participant in a first virtual meeting of a plurality of virtual meetings hosted by a virtual conference provider, a first message from a first messaging channel of the first virtual meeting, wherein:
the first virtual meeting has a first plurality of participants and the first messaging channel,
the first messaging channel provides text messaging between the first plurality of participants, and
the message was posted by a first participant of the first plurality of participants;
receive, from a second client participating as a second virtual participant in a second virtual meeting of the plurality of virtual meetings, a second message from a second messaging channel of the second virtual meeting, wherein:
the second virtual meeting has a second plurality of participants and the second messaging channel,
the second messaging channel provides text messaging between the second plurality of participants, and
the message was posted by a second participant of the second plurality of participants;
determine that the first message or the second message comprises a question;
transmit the question to a moderator device;

receive, from the moderator device, an indication to present, the question;
generate a visual overlay comprising the question;
modify a first video stream of the first virtual meeting based on the visual overlay, wherein pixels corresponding to the visual overlay are superimposed onto pixels of the first video stream enabling at least a portion of the question to be visually combined with the first video stream; and
output the modified first video stream to a third participant of the first virtual meeting.

7. The system of claim 6, wherein the one or more processors are configured to execute further processor-executable program instructions stored in the non-transitory computer-readable medium to:
position, within the visual overlay, the first message at a first position and the second message at a second position, wherein the first position is above the second position.

8. The system of claim 6, wherein the one or more processors are configured to execute further processor-executable program instructions stored in the non-transitory computer-readable medium to:
receive, from either the first client or the second client, an additional message from an additional participant;
update the visual overlay to include the additional message; and
modify the first video stream based on the updated visual overlay.

9. The system of claim 6, wherein the first video stream comprises a first aspect ratio and wherein the one or more processors are configured to execute further processor-executable program instructions stored in the non-transitory computer-readable medium to:
generate an additional visual overlay comprising the first and second messages;
modify an additional video stream based on the additional visual overlay; and
output the modified additional video stream, wherein the modified additional video stream comprises a second aspect ratio that is different from the first aspect ratio.

10. A non-transitory computer-readable medium comprising processor-executable instructions configured to cause one or more processors to:
receive, from a first client participating as a first virtual participant in a first virtual meeting of a plurality of virtual meetings hosted by a virtual conference provider, a first message from a first messaging channel of the first virtual meeting, wherein:
the first virtual meeting has a first plurality of participants and the first messaging channel,
the first messaging channel provides text messaging between the first plurality of participants, and
the message was posted by a first participant of the first plurality of participants;
receive, from a second client participating as a second virtual participant in a second virtual meeting of the plurality of virtual meetings, a second message from a second messaging channel of the second virtual meeting, wherein:
the second virtual meeting has a second plurality of participants and the second messaging channel,
the second messaging channel provides text messaging between the second plurality of participants, and
the message was posted by a second participant of the second plurality of participants;
determine that the first message or the second message comprises a question:
transmit the question to a moderator device;
receive, from the moderator device, an indication to present the question;
generate a visual overlay comprising the question;
modify a first video stream of the first virtual meeting based on the visual overlay, wherein pixels corresponding to the visual overlay are superimposed onto pixels of the first video stream enabling the at least a portion of the question to be visually combined with the first video stream; and
output the modified first video stream to a third participant of the first virtual meeting.

11. The non-transitory computer-readable medium of claim 10, further comprising processor-executable instructions configured to cause the one or more processors to:
position, within the visual overlay, the first message at a first position and the second message at a second position, wherein the first position is above the second position.

12. The non-transitory computer-readable medium of claim 10, further comprising processor-executable instructions configured to cause the one or more processors to:
receive, from either the first client or the second client, an additional message from an additional participant;
update the visual overlay to include the additional message; and
modify the first video stream based on the updated visual overlay.

13. The non-transitory computer-readable medium of claim 10, wherein the first video stream comprises a first aspect ratio, and further comprising processor-executable instructions configured to cause the one or more processors to:
generate an additional visual overlay comprising the first and second messages;
modify an additional video stream based on the additional visual overlay; and
output the modified additional video stream, wherein the modified additional video stream comprises a second aspect ratio that is different from the first aspect ratio.

14. The non-transitory computer-readable medium of claim 10, further comprising processor-executable instructions configured to cause the one or more processors to:
identify, from the first message and the second message, a message comprising text that is inappropriate or harmful; and
responsive to the identifying, remove the text from the message.

* * * * *